United States Patent
Ensel et al.

(10) Patent No.: US 6,493,685 B1
(45) Date of Patent: Dec. 10, 2002

(54) ELECTRONIC ACCOUNT PRESENTATION AND RESPONSE SYSTEM AND METHOD

(75) Inventors: Laura A. Ensel, Douglaston, NY (US); William E. Rykowsky, S. Setauket, NY (US); Louis A. Fuertes, New York, NY (US)

(73) Assignee: The Chase Manhattan Bank, NY (US)

( * ) Notice: Subject to any disclaimer, the term of this patent is extended or adjusted under 35 U.S.C. 154(b) by 0 days.

(21) Appl. No.: 09/248,495

(22) Filed: Feb. 10, 1999

(51) Int. Cl.[7] .............................................. G06F 17/60
(52) U.S. Cl. .......................................... 705/40; 705/34
(58) Field of Search ............................ 705/34, 38, 10; 707/10

(56) References Cited

U.S. PATENT DOCUMENTS

| | | |
|---|---|---|
| 5,383,113 A | 1/1995 | Kight et al. |
| 5,465,206 A | 11/1995 | Hilt et al. |
| 5,483,445 A * | 1/1996 | Pickering ..................... 705/40 |
| 5,677,955 A * | 10/1997 | Doggett et al. ............... 380/24 |
| 5,699,528 A | 12/1997 | Hogan |
| 5,790,793 A | 8/1998 | Higley |
| 5,809,242 A | 9/1998 | Shaw et al. |
| 5,832,460 A | 11/1998 | Bednar et al. |
| 5,873,072 A | 2/1999 | Kight et al. |
| 5,884,288 A | 3/1999 | Chang et al. |
| 5,920,847 A | 7/1999 | Kolling et al. |

(List continued on next page.)

FOREIGN PATENT DOCUMENTS

| | | | |
|---|---|---|---|
| EP | 0745947 A2 * | 4/1996 | |
| WO | WO9724680 * | 10/1997 | |
| WO | WO 9815925 | 4/1998 | |
| WO | WO 9826364 | 6/1998 | |
| WO | WO 9858339 | 12/1998 | |
| WO | WO 9905628 | 2/1999 | |
| WO | WO 9907102 | 2/1999 | |
| WO | WO 9910823 | 3/1999 | |
| WO | 9913421 | 3/1999 | |
| WO | 9915999 | 4/1999 | |

OTHER PUBLICATIONS

"Edify Unveils Industry's First Complete Bill Presentment and Payment Solution"; Sep. 1998, PR Newswire, Dialog file 20, Accession No. 02828739.*

(List continued on next page.)

Primary Examiner—Tariq R. Hafiz
Assistant Examiner—Romain Jeanty
(74) Attorney, Agent, or Firm—Dickstein, Shapiro, Morin & Oshinsky, LLP.

(57) ABSTRACT

An Information Interface Provider (IIP) acting as the interface between a biller and its customers for both the presentment of electronic bills to the customers and for the processing of payments from the biller's customers. The IIP creates and electronically publishes bills to the biller's customers in response to data provided by the biller and processes the payments in response to instructions provided by the customers. Bill publication is accomplished by any and/or all channels of distribution which are effective in reaching the customers of the biller including Internet web sites, Email and personal digital assistants, for example. Once billing data has been received by the IIP, the IIP formats the billing data for storage in its own internal database and then performs the task of reformatting the bill for the particular channel(s) of distribution selected by the customer. Several types of customer payments are processed by the IIP including Automated Clearing House (ACH) payments, credit or debit card payments, paper checks, smart card payments, and digital currency payments. Once the IIP has debited the consumer's account for the payment, it credits the account of the biller. The IIP consolidates all of the Accounts Receivable (A/R) information and presents the biller with a single file which can then be used by the biller to update its own internal A/R systems.

66 Claims, 10 Drawing Sheets

U.S. PATENT DOCUMENTS

| | | | | |
|---|---|---|---|---|
| 5,956,700 | A | | 9/1999 | Landry .......................... 705/40 |
| 5,963,925 | A | * | 10/1999 | Kolling et al. ................ 705/40 |
| 6,044,362 | A | | 3/2000 | Neely |
| 6,049,786 | A | * | 4/2000 | Smorodinsky ............... 705/40 |
| 6,070,150 | A | * | 5/2000 | Remington et al. ........... 705/34 |
| 6,157,924 | A | * | 12/2000 | Austin .......................... 707/10 |
| 6,304,857 | B1 | * | 10/2001 | Heindel et al. ............... 705/34 |
| 6,327,577 | B1 | * | 12/2001 | Garrison et al. .............. 705/40 |

OTHER PUBLICATIONS

"Cybercash's Will Integrate Its PayNow Electronic Check Service To Be Integrated With Oracle's New Bill Presentment and Payment Solution"; Businesswire, Dialog file: 810, Accession No. 0946501, Feb. 1998.*

Integrion Brings Visa And Checkfree Together to Create Next Generation Payments Capability, Press Release, May 20, 1998, 2 pgs.

NET delivery KEY Choice to Enable Electronic Services Offered by Canada Post Corporation and Cebra Inc., Press Release, Jun. 15, 1998, 2 pgs.

Cabledata and International Billing Services Add Electronic Billing and Payment to Cabledata Customer's Options, Press Release, Apr. 20, 1998, 2 pgs.

CBIS and International Billing Services Team to Offer Electronic Billing Solution Via Internet, Press Release, Jul. 13, 1998, 1 pg.; and printout of geis.com website, re: Electronic Billing Payment and Presentment Services (EBPP), Dec. 9, 1998, 2 pgs.

ARKSYS and TriSense Software Announce Strategic Alliance—Business Wire, May 14, 1998, 2 pgs.

New Electronic Banking System Release 3 Helps Financial Institutions Build Customer Loyalty, PR Newswire, Sep. 16, 1998, 2 pgs.

Banc One to Launch Integrated Electronic Banking, Bill Presentment and Payment Services Through Integrion and CheckFree—PR Newswire, May 15, 1998, 3 pgs.

AT&T and CheckFree to Provide AT&T Customers with new Electronic Billing Options on the Internet—Business Wire, Jun. 9, 1998, 3 pgs.

MCI Systemhouse and NETdelivery form EBPP partnership, May 5, 1998, 2 pgs.

CheckFree to provide Bill Presentment and Payment for Intuit's Software and Quicken.com Web site, Apr. 27, 1998, 1 pg.

Online Billing Gets Backers, Netscape, IBM Ready Services, Oct. 5, 1998, 2 pgs.

FSTC Press Release, Oct. 29, 1998, 5 pgs.

MCI Systemhouse, NETdelivery Form Electronic Billing and Payment Partnership—PR Newswire, May 5, 1998, 3 pgs.

AT&T And CheckFree To Provide AT&T Customers With New Electronic Billing Options On The Internet, Jun. 9, 1998, 2 pgs.

Intuit., AT&T Offer Electronic Billing System—The American Banker, Jun. 16, 1998, 1 pg.

Electronic Bill Payment/Presentment Business Practices, Draft for Public Comment, Bill Payment Council, Nov. 12, 1998, 35 pgs.

Electronic Billing: Postage Due, By Jeetu Patel, Gautam Desai, Jason Bromberek and Jason Levitt, InformationWeek Labs, Nov. 30, 1998, pp. 73, 76, 78, 80, 82, 84.

printout of MSFdc.com website re: TransPoint, 1997–98, 16 pgs.

printout of invoicelink.com re; InvoiceLink Website, 31 pgs.

CheckFree, Visa Launch Payment Service—Bank Technology News, Jul. 1998, 3 pgs.

MCI Systemhouse Develops Electronic Billing Service—Network World, May 18, 1998, 1 pg.

* cited by examiner

ELECTRONIC ACCOUNT PRESENTATION AND RESPONSE SYSTEM AND METHOD

FIELD OF THE INVENTION

The present invention generally relates to systems and methods for publishing electronic information to consumers and for processing consumer's responses and more particularly to a system and method for presenting electronic bills to consumers and for processing consumer payments.

BACKGROUND OF THE INVENTION

Electronic Bill Presentment and Payment (EBPP) is an electronic alternative to the traditional paper bill presentation and payment methods which have dominated commerce since the establishment of postal services. Separate from the accounting costs, some of which will be incurred regardless of the method of bill presentment and payment, the cost of presenting and paying bills using traditional paper methods is astronomical. Large billers (credit card, mortgage, car loans, student loans . . . ) are interested in EBPP for its cost displacement, revenue generation, and image enhancement potential.

Using EBPP, an entity which generates invoices (bills) for its goods and services is able to present bills electronically to its customers and enables the consumer to pay the bills electronically. In one simple model of EBPP, the invoicing entity, hereinafter a "biller", generates the electronic bill itself and presents the electronic bill directly to its customer. The direct bill presentment is typically accomplished through an Internet web site maintained by or for the biller. This form of direct electronic bill presentment has certain advantages such as increasing consumer traffic to the biller's web site, which can generate additional revenues. Direct biller presentment also leverages the biller's investment in the web site. Finally, by using direct biller presentment, the biller can totally control each segment of the bill presentment and payment process. The entity which actually presents the interface to the customer is denoted as a Consumer Service Provider (CSP). As stated above, the functions of the CSP can be accomplished in-house by the biller itself, or outsourced to a firm which specializes in this type of function.

The greatest disadvantage of direct biller presentment is that the biller's customers must initiate the process of logging onto the biller's site on the Internet in order to view, review and pay its bills. This is known in the art as an example a "pull" type technology in which the consumer must take an active step of logging onto the biller's site. In contrast to the above described "pull" technology, "push" technology is exemplified by the traditional paper billing process in which the paper bill is "pushed" to the customer's mailbox at his/her mailing address. Another significant drawback of the direct biller presentment model is that, from a consumer's point of view, only bills from a single biller can be presented and paid at a the biller's web site. For example, if a customer's telephone service provider maintains a direct bill presentment web site, the customer can only pay its telephone bill at that site, and not its cable bill. To pay the cable bill, the consumer must log off of the telephone company's site and log onto the cable company's site. Still another disadvantage of direct bill presentment by the biller is that the biller must create a method by which the customer may pay the bill electronically while being logged onto the biller's site. Although several methods of processing electronic payments have been developed over the last few years, it is up to the biller to adopt, maintain and/or outsource one or more of these methods. There are actually two functions associated with payment processing. First, the function of actually interfacing with the consumer is accomplished by an entity which is denoted as a Consumer Payment Provider (CPP). The second function is processing the biller's credits which is performed by a Biller Payment Provider (BPP). Although these are two separate and distinct functions associated with payment processing, they are often performed by the same entity.

A second model for EBPP is through a consolidated bill presentment site. Through this method, access to electronic bills from several billers is provided on a single bill presentment site. Typically a bank provides a bill presentment site, after it has agreement from several billers (or the agents of billers) to act as the electronic bill presenter on behalf of the billers. An advantage to the biller in using a consolidated site is that it avoids the costs of developing and maintaining the site itself. Although the entity maintaining the consolidated site (the "consolidator") will charge the biller for the service (typically on a transactional basis) the costs to the biller are significantly less than a self maintained site. Furthermore, the consolidator will typically provide some sort of payment processing service as described above. This is one reason which banks are drawn to this role, since banks typically have the systems and processes for payment processing. The consolidated approach is attractive to consumers in that a consumer can log onto a single site (typically with a single password) and have access to several electronic bills from several different billers. Another advantage of a consolidated site is that it does not exclude the biller from separately maintaining its own direct presentation site as described above. Even if the biller has its own Internet site which it uses for EBPP, the additional use of the consolidated site will only increase the likelihood that a biller's customer will use EBPP and thereby save the biller money by avoiding the traditional, and costly, paper billing system.

As with the direct bill presentment model described above, the greatest disadvantage of consolidated presentment is that it is a pull technology in which the consumers must initiate the process of logging onto the consolidated bill presentment site. Although it represents an advance over the direct presentation model, another disadvantage of the consolidated model is that a consumer can only electronically view and pay a subset of its bills at the consolidated site. The subset is usually defined by the number of billers which a consolidator is able to attract to its site. The advantage of the Internet being accessible national-wide (international) is, in part, a disadvantage from the perspective of EBPP which must take into account regional or local bills. For example, two of the monthly bills typically paid by most consumers are telephone and utility bills. By their very nature, the billers for these services are organized on a regional or local basis. For this reason, consolidators have an easier time attracting national billers (e.g., Sears) than they have signing up a local utility company. Another disadvantage for a biller using a consolidator is that the biller loses a significant marketing opportunity with respect to its customers. Typically, a consolidator will only provide the biller with a limited capability to present marketing materials to its customers. Furthermore, there exists the potential that a competitor of biller will also appear on the consolidated site and potentially drain customers away from the biller. A final and significant disadvantage of consolidated bill presentment is that the biller must, in some form, provide its billing data to the consolidator. Separate from the technical details of formatting its billing data in a form which the consolidator can use, the biller loses control of the process by the employment of a consolidator. Although contractual and legal obligations can be created with respect to the consolidator, the biller must always be concerned that its customer's billing data provided to the third party consolidator is not mishandled or misused.

One additional model for EBPP is through the use of Email. In this model, the biller, or the biller's agent generates the electronic bill which is forwarded directly to the consumer's designated electronic mailbox (Email address). The greatest advantage of this model is that, through the push technology of Email, the electronic bill is sent directly to the customer, without the customer having to take any action whatsoever. Naturally the customer must open his or her Email in order to actually view the electronic bill, but the consumer does not have to actively seek out the bill. Another advantage of the Email model is that, assuming all the customer's billers adopt this approach, all of the customer's bill arrive at a single mailbox. The Email model is closest parallel to the traditional paper billing process with which everyone is familiar. The most significant drawback of the Email model is the lack of security for the billing and payment information. Although encryption techniques are currently available, the lack of a consistent Email interfaces renders these encryption techniques difficult to practically implement. A further disadvantage of the Email model is the lack of a certification of delivery of the Email message containing the electronic bill. This generates uncertainty, both from the biller's and customer's point of view, whether or not a particular electronic bill was sent by the biller and/or received by the customer. A final drawback of the Email model is lack of any legal precedent governing this type of bill presentation.

In light of the disadvantages of each of the above described models for EBPP, there is a need felt in the industry for a system and method which: provides attractive financial opportunities for billers; maximizes consumer reach; guarantee privacy and security; facilitated rapid functional evolution; and avoids disruptions to a biller's systems and operations environment.

SUMMARY OF THE INVENTION

The present invention incorporates the advantages of each of the models described above in an integrated solution which minimizes the disadvantages associates with each model. The core of the present invention is an entity known as an Information Interface Provider (IIP). The IIP takes on the role of the information interface between a biller and its customers. In a preferred embodiment, the IIP provides a billing interface (for both bill presentment and payment processing) but the IIP is also able publish a variety of information for different types of entities, such as 401K statements for financial institutions. Although the below detailed description describes the preferred embodiment of electronic bill presentment, the present invention is not limited to such an embodiment. In its central function, the IIP creates and publishes bills to the biller's customers in response to data provided by the biller and processes the payments in response to instructions provided by the customers. The IIP maintains a Biller Acquisition Platform (BAP) which is a biller's single pipeline to the ever expanding EBPP world. The BAP is not a presentment site, rather it is a staging area which facilitates presentment to the biller's customers via any vehicle (web sites, email . . . ) and facilitates payment via any accepted payment mechanism (ACH, credit card, paper check, digital cash . . . ).

The IIP accomplishes the bill publication by any and/or all channels of distribution which are effective in reaching the customers of the biller. These channels include, for example, traditional paper distribution, biller direct Internet site, a Customer Service Provider (CSP) operated Internet presentation site, consolidated Internet presentation sites, Email, personal digital assistants, voice response units, video phones, programmable cellular phones, interactive cable TV, interactive satellite TV, smartphones, telephones, facsimile, Automated Teller Machines (ATM), and pagers. In one embodiment of the present invention, the customer selects one channel by which it is to be presented bills and the IIP transmits the bill through that single channel of distribution. In an alternative embodiment, the customer can select several of the above channels and the IIP will ensure that the bill is available on each of the customer selected channels. In addition, the IIP can ensure that certain bills will only be published through certain channels.

In providing the core billing function, the role of the IIP is to insulate its customers, the billers, from the physical task of presenting the bills to the consumers and from processing the payments from the consumers. In order to carry out the task of presenting the bills to the consumer, the IIP must have access to the "raw" billing data from the biller. This access can be accomplished either through direct access by the IIP to the accounting systems of the biller or through a data feed from the biller to the IIP. Once the billing data has been received by the IIP, the IIP formats the billing data for storage in its own internal database and then performs the task of formatting the bill for the particular channel(s) of distribution selected by the customer. Each biller has its own format and content for its "raw" billing data. Each channel of distribution has a distinct format and restrictions on content. Each customer has its own selected preference(s) for the channel on which the bill is to be presented. In light of all of these variables, the function of correctly formatting a particular bill for a particular customer is a significant task for the IIP. The present invention performs this formatting task using relational and object oriented databases which are the core of the BAP.

In addition to presenting the bills, the IIP is also responsible for processing the payment from the consumers on behalf of the biller. As described above, an IIP performing this function is acting as a CPP. Several types of consumer payments are envisioned in the present invention including Automated Clearing House (ACH) payments, credit or debit card payments, paper checks, smart card payments, and digital currency payments. Furthermore, the IIP must be able to track preauthorized payments of certain bills by customers. Using preauthorization, the consumer may authorize the IIP to debit a preselected consumer account with respect to certain bills, typically recurring bills for the same amount, e.g., a mortgage payment. Once the IIP has debited the consumer's account, it performs the role of a BPP and credits the account of the biller. The IIP consolidates all of the Accounts Receivable (A/R) information (i.e., which consumers have paid their bills and how much) and presents the biller with a single file which can then be used by the biller to update its own internal A/R systems.

As described above, in addition to performing billing functions, the IIP has the capability to electronically publish virtually any type of information which an entity desires to distribute to its customers. For example, the IIP can provide electronic statements to the entity's customers (e.g., a statement of a 401K account or an insurance policy). Furthermore, the IIP can include marketing or other informational inserts in a presented statement or bill and perform ordering, payment and fulfillment functions with respect to the marketing and/or informational inserts. Additional functions of the IIP are to provide consolidated customer service data, collect and store customer enrollment data and customer preferences, and to provide a consolidated bill activation process. Each of these additional services performed by the IIP is ancillary to the core electronic publication function and can be performed or not performed at the request of the biller or other entity. In the preferred embodiment, since the goal of the IIP is to isolate the biller from the customer billing interface, it is anticipated that most billers would want the IIP to perform these additional functions. Any statement or marketing inserts which are to presented to the customer must also go through a formatting process, depending on the intended channel of distribution.

Customer service functions performed by the IIP include responding to customer and or biller inquiries regarding bills and payments. In one embodiment of the present invention, the role of the IIP is to either resolve the consumer's problem directly, if possible, or in any event to guide the consumer to the entity having responsibility for resolution of the problem (e.g., the consumer's bank, the biller itself, the CSP . . . ). In an alternative embodiment, the IIP does not perform the customer service function directly, but rather maintains and provides the biller with access to a customer service database which can be utilized by the Customer Service Representative (CSR) of the biller in order to track customer service inquiries to their conclusion.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

As described above, although a preferred embodiment, the present invention is not limited to the electronic publication and processing of bills. As will be apparent to one skilled in the art, the present invention can electronically publish virtually any type of information which an entity desires to distribute to its customers. For example, the IIP can provide electronic account information relating to other goods or service providers such as financial securities information (including 401K data, proxy statements, prospectuses, checking or savings account statements, etc.), government related information (including tax reporting data, social security financial data, medicare data, etc.), medical information, insurance account information, and other business information (for example, airline ticketing, scheduling, shipment or purchasing information).

Figure 1:
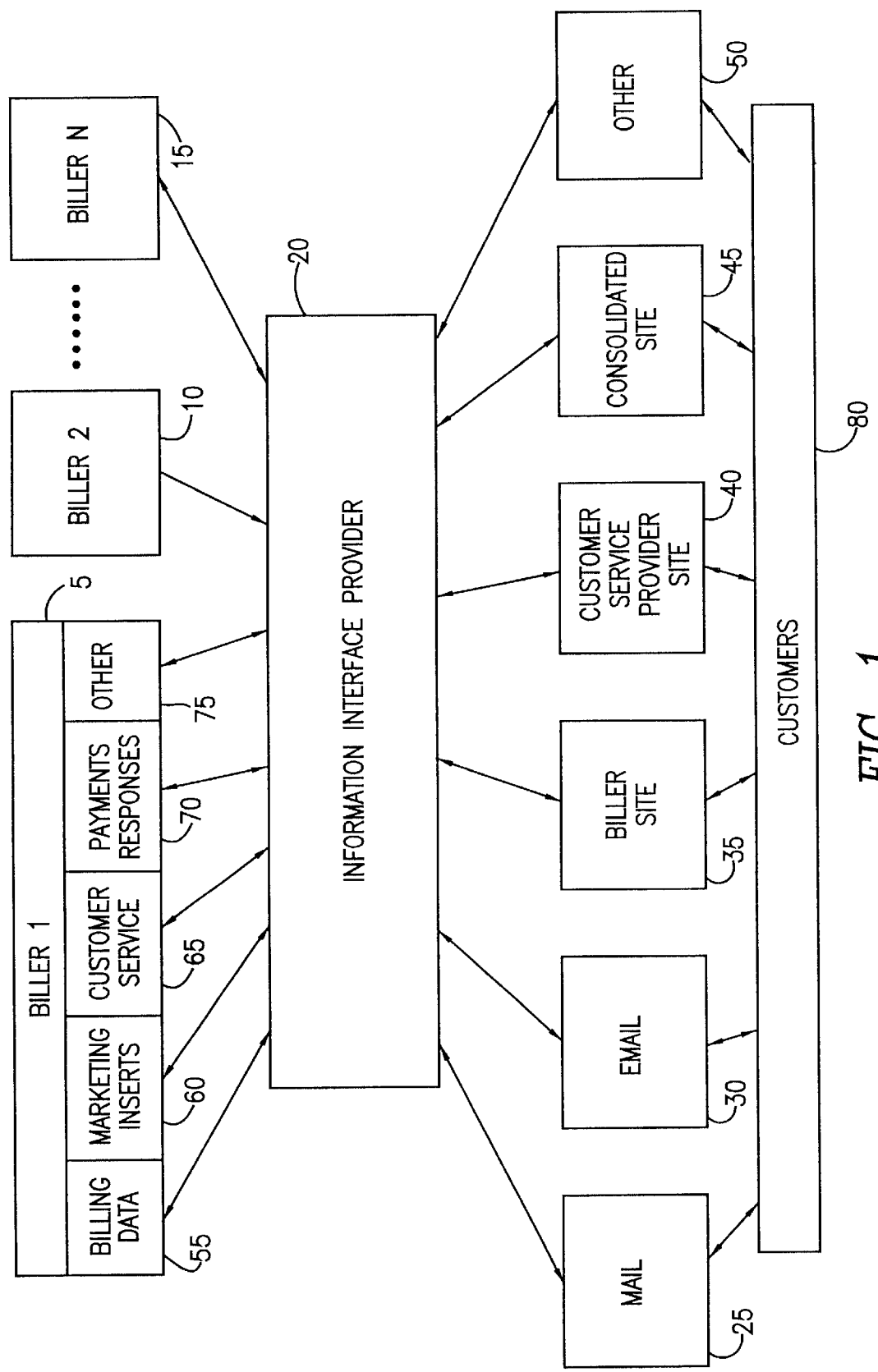
FIG. 1 is a schematic diagram illustrating the data flows between the Billers, the Information Interface Provider and the channels of distribution.

FIG. 1 schematically illustrates the various entities and the flow of data according to the present invention. The Information Interface Provider (IIP) 20 of the present invention is capable of providing billing services to any number of billers 5–15 through any number of channels of distribution 25–50 to the customers 80 of the billers. The only real limit on the number of billers that can be accommodated by the IIP 20 are the physical facilities of the IIP 20 (e.g., phone lines, processors, data storage . . . ). There is no restriction of the type of billers 5–15 that can use the IIP 20 of the present invention, other than the biller has accounting systems which can generate billing information on a recurring basis (or has accounting systems that can be accessed by the IIP 20). For example, the IIP 20 can just as easily service a wholesaler (manufacturer), a retailer (department store) or a service provider (telephone or utility service). If the entity using the service of the IIP 20 is other than a biller, the only restriction is that the entity must be capable of providing (or providing access to) the information which the entity wishes to be published to its customers 80 (e.g., 401K statement data).

Four specific types of data 55–75 are depicted as flowing between a biller 5–15 and the IIP 20. Although only illustrated with respect to biller 5, the same types of data flows are applicable to all of the billers 5–15. In the embodiment depicted in FIG. 1, billing data 55 flows from biller 5 to IIP 20. In an alternative embodiment, the IIP 20 can access the legacy accounting files of the biller 5 directly in order to extract the required billing data 55. The format of the billing data 55 from biller 5 is determined by the biller 5. The IIP 20 places no restrictions on the format of the billing data 55 as it is received from biller 5, other than the IIP 20 has knowledge of the format of the data being delivered. As described in more detail below, it is the responsibility of the IIP 20 to reformat the billing data 55 in the format required for its own internal databases and then to format the actual published bill, statement or other information as is appropriate for the channel of distribution particular to a specific customer 80 receiving the presented bill or other information.

In addition to the billing data 55, the biller 5 may also provide marketing materials 60 that it desires to be presented to its customers 80. In one embodiment of the present invention, if the biller 5 only desires certain customers 80 to receive certain marketing inserts 60, the biller 5 can identify which customers 80 are to receive which inserts 60. In an alternative embodiment, the IIP 20 provides value added marketing in which, based on criteria provided by the biller 5, the IIP 20 can determine which customers 80 are to be presented which marketing inserts. For example, if the biller 5 decides to run a rebate program in which, depending on the usage of the customer accounts, the biller 5 will provide discounts to the customer 80 on his next bill. In this example, the biller 5 could provide the criteria to the IIP 20 that if a customer's current bill is $100, the IIP 20 is to present an insert which offers the customer 80 a $10 rebate on the next bill if it remains in excess of $100. The biller 5 could provide graduated rebates that increase with larger bills. With this criteria in hand, the IIP 20 is able to electronically query the current bills of all of the customers 80 of the biller 5, and insert the correct promotion into the bills which is presented to the customers 80. A further example of a marketing insert is a promotion being run by the biller 5. For example if the biller 5 is credit card service provider, the biller 5 could be running a promotion for a new credit card which accumulates frequent flyer miles. An insert offer the new credit card can be presented to the customers 80 along with their credit card bill, or as completely separate presentment. Responses from the customers 80 to such inserts would be via link 70 depicted in FIG. 1. As described above, certain channels of distribution have restrictions on the format and content of such marketing inserts. For example certain Customer Service Providers (CSPs) with Internet presentment sites might limit such marketing inserts to a certain size with no interactive capability.

Element 65 in FIG. 1 represents the customer service link between the biller 5 and the IIP 20. This link encompasses both electronic communication between biller 5 and IIP 20 as well as telephone and paper communications. The majority of data flowing in this link is related to the resolution of billing problems as more fully described below. Additionally, customer service data includes customer 80 address changes as well as status and preference changes related to customers 80. For example, a customer 80 might have been paying bills manually (i.e., reviewing the bill and initiating the payment of the bill after its review). At some point, the customer 80 might decide that he or she would like to have this bill paid automatically every month. This type of change information would typically be transmitted to the IIP 20 (typically from the customer 80 itself or from a CSP 35–40) which in turn would be transmitted to the biller 5 for its records.

As will be more fully described below, the IIP 20 forwards a consolidated payment file 70 to the biller 5 reflecting the payments made by customers 80 during the applicable time period. In order to achieve one of its primary goals of insulating the biller 5 from the billing process, the IIP 20 consolidates all of the customer payments from all of the various channels of distribution 25–50 for which it is responsible, into a single Account Receivable (A/R) payment file. The single A/R payment file can then be used to update biller's legacy A/R systems. This feature of the present invention alone is a significant advance over the prior art. In the prior art, the biller 5 was faced with accumulating different payment files from each of its channels of distribution and separately updating its in-house A/R files. Even if it was able to require each its agents managing the various channels of distribution to conform to a standard format and timing of the transmission of the payment files, the biller 5 still had to coordinate the updating of it's A/R files from several different payment files. In the present invention, the biller 5 receives a single payment file which reflects all of the payments received from its customers 80, regardless of the channel by which the customer 80 was presented the bill or the manner in which the customer 80 paid the bill.

As described above, the IIP 20 also transmits customer responses 70 to the biller 5. In addition to the response described above with respect to a credit card service provider, responses 70 can also include any type of response or instruction from a customer 80 to the biller 5. For example, if the biller 5 is a financial services provider, the customer 80 can convey a buy a or sell instruction to the biller 5 via the IIP 20. This type of customer instruction might be in response to a statement of the customer's 401K account which was electronically presented to the customer 80 using the present invention. Such a 401K statement is illustrated in FIG. 1 under element 75 labeled "Other". Element 75 is intended to illustrate any type of information which the biller 5 desires to transmit to its customers 80. For example, an insurance company might want to present an update to a policy to a customer 80 using the present invention. Virtually any type of information which a biller 5 wishes to convey to its customers 80 can be safely and securely transmitted by the present invention which also enables secure communication back from the customer 80 to the biller 5.

Five specific types of channels of distribution have been illustrated in FIG. 1: regular paper mail 25; Email 30; a biller direct presentation site 35, a Customer Service Provider (CSP) presentation site 40; and a consolidated CSP site 45. As previously described, the IIP 20 of the present invention is capable of taking "raw" billing data from a biller 5, and formatting the billing data in the appropriate way in order to present the bills to the customers 80 of the biller 5. As will be described below, the IIP 20 has knowledge of the channel (s) on which a particular customer 80 has selected for presentation of a bill and the IIP 20 formats the bill as appropriate for the selected channel.

Channel 25 represents the traditional paper mail channel of distribution of bills. If a customer 80 does not have access to an electronic channel (e.g., does not have a personal computer) or does not want to receive electronic bills, the IIP 20 receives the billing data from the biller 5 and generates a traditional paper bill for the customer 80. In one embodiment of the present invention, the IIP 20 itself generates the paper bills for publication to the customers 80. Alternatively, the IIP 20 outsources the actual production and mailing of the paper bills to a third party. In addition in either of these embodiments, or in an embodiment in which the biller 5 publishes the paper bills itself or outsources the publication, the IIP 20 can be responsible for all or part of the processing of payments from the customers 80. For example, payments made in response to paper bills can be directed to the IIP 20 for processing and inclusion in the consolidated payment file 70 which is transmitted to the biller 5 by the IIP 20. Alternatively, the IIP 20 may only be delegated the responsibility for the processing of preauthorized, automatic payment of paper bills (whether or not the IIP 20 even generated the paper bill). The present invention has sufficient flexibility to accommodate any level of service requested by the biller 5.

Channel 30 represents an Email channel of distribution. If a customer 80 has selected to receive electronic bills via Email, upon receipt of the billing data from the biller 5, the IIP 20 formats the electronic bill, encrypts it and send the Email to the Email address previously provided by the customer 80. Once the Email message has arrived at the server containing the customer's Email account, the customer 80 is able to open the message, decrypt and review the bill. In one embodiment of the present invention, the mechanism for effecting the customer's payment is included in the Email message, for example code which creates a "pay the bill" type button. In one example, this button may link the customer to a biller direct site 35 or another CSP site (e.g., one maintained by the IIP 20) where the customer can pay the electronic bill. Alternatively, the Email message sent to the customer contains code which enables the customer to formulate its payment instructions which are then encrypted and sent back to the IIP 20 in a return Email message. In one further embodiment, the electronic bill sent to the customer via Email is directly analogous to a traditional paper bill and the customer 80 pays the bill through the more traditional channels (e.g., sending back a paper check).

Channel 35 represents an Internet web site maintained by or for the biller 5 directly. Most large commercial entities today maintain web sites for providing information to their customers 80 and for marketing their goods and or services. As part of these web sites 35, more and more corporations are providing the capability for customers 80 to review their accounts and review and pay electronic versions of their bills. Although some corporations maintain these web sites themselves, very often, the job of maintaining these sites is outsourced to other firms. Regardless of whether the site 35 is maintained in house or outsourced to another firm, the IIP 20 is capable of taking the "raw" billing data directly from the biller 5 and formatting the customer's bill electronically for presentation on the biller's web site 35. As will be described below in detail, the IIP 20 is capable of processing instructions for payment received from customers 80 through the biller's direct site 35.

Two different CSP presentation sites 40 and 45 are depicted in FIG. 1. CSP 40 represents a generic presentation site, while CSP 45 represents a consolidated site which is directly associated with a number of billers 5–15. Through the consolidated site 45, a customer 80 can pay a number of bills from a variety of billers 5–15. Two examples of consolidated CSP sites 45 are Checkfree™ and Transpoint™ affiliated sites. Consolidated CSP Internet sites are typically developed and maintained by a third party entity. Typically, the third party entity enters a relationship with a biller or a financial institution (e.g., a bank) in which the site 45 is branded for the biller or the institution, but the interface and all of the functionality has been developed and is maintained by the third party such as Checkfree™ and Transpoint™. Although these two services will be used as examples throughout the remainder of this discussion, the present invention is in no way limited to functioning with solely these two CSPs. The IIP 20 of the present invention is capable of operating with any CSP 40 or 45, either now existing or arising in the future, which has defined interfaces and functionality.

As with the biller's direct site, the IIP 20 formats the electronic bill in the format required by the particular CSP 40, 45, renders the electronic bill for the CSP 40, 45, which then presents the electronic bill to the customer 80. Some of the CSPs 40, 45 existing today are capable of processing some forms of payments and not others. If the CSP 40, 45 is capable of processing the payment itself, it forwards the payment data to the IIP 20 for consolidation with the payment data from the remainder of the biller's customers 80. If the CSP 40, 45 is not capable of processing a payment, the customer's instruction for payment is transmitted to the IIP 20 which processes the payment and subsequently reports the payment to the biller 5 in the consolidated A/R file.

Element 50 in FIG. 1 represents other channels of distribution already in existence and those yet to be developed. Other existing channels include telephone, personal digital assistants, pagers, video phones, Voice Response Units (VRU), programmable cellular phones, interactive cable television, interactive satellite TV, smartphones, facsimile and Automated Teller Machines (ATM) for example. A telephone line can be used to review and pay bills through a Voice Response Unit (VRU) system. With a modem, the telephone can also be used to view and pay bills with a personal computer and appropriate software such as Quicken™ or MS Money™. In addition, element 50 represents other channels of payment back to the IIP 20 such as smart cards or digital currency.

Figure 2:
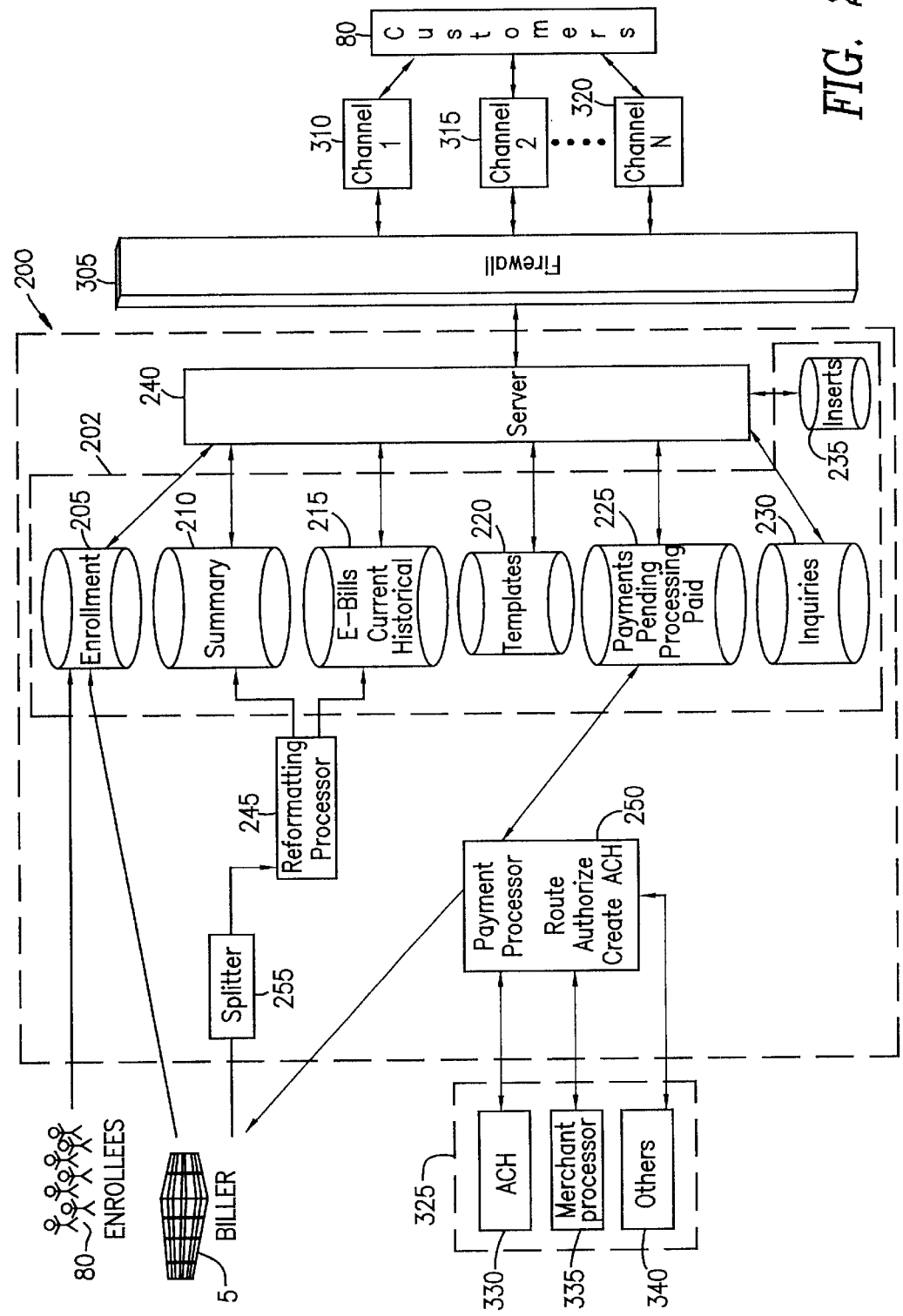
FIG. 2 is an overview of the flow of data through the Biller Acquisition Platform.

FIG. 2 illustrates an overview of structure of the elements of the present invention as well as the processing and data flow. Element 200 illustrates the structure of the Biller Acquisition Platform (BAP). The central feature of the design of the BAP 200 is that it is a database driven system. The BAP 200 includes a database server 202 having, for example, six database including an Enrollment file 205; a Bill Summary file 210; an E-Bill file 215 containing both current and historical data related to E-Bills; a Template file 200 containing the templates required to format electronic bills for the various channels of distribution 310–320; a Payment file 225 containing both currently pending payments and payments made over a certain period; an Inquiry file 230 for use in tracking and resolving customer and biller inquiries; and an Insert file 235 containing marketing inserts. Each of the database files is structured on a biller by biller basis. The database files 205–230 can either be relational databases, object oriented databases or a combination of both types.

The Enrollment database 205 contains all of the information relevant to the customers 80 of the biller 5. Examples of the type of information included in Enrollment database 205 includes, but is not limited to: customer name, biller account number, address, home phone, office phone, fax number, pager number, social security number, date of birth, maiden name, a 'password'; a preferred presentment vehicle (channel of distribution) and alternate presentment vehicles; customer presentment preferences (e.g., present my bill as soon as available, at the end of month, exception presentment (only present my bill if dollar amount exceeds a limit, otherwise automatically pay the bill, generate a paper bill if condition X occurs . . . )); presentment configuration data (e.g., Email address, Email system/protocol, browser type and version . . . ); bill format preferences (e.g., send me summary only, partial details, full details . . . ); reminder preferences (e.g., as soon as possible, at end of month, 5 days before due date, on due date, 5 day late, no reminder . . . ); reminder channel (e.g., email, paper mail, fax, phone call, beeper . . . ); preferred payment mechanism, a plurality of (e.g., nine) alternate payment mechanisms (i.e., IIP 20 needs to know all the payment options with respect to the client); payment preferences (e.g., preauthorized, on due date, at end of month, full or fixed amount, automatic within limit); and solicitation preferences (e.g., no solicitations, by industry (airlines, investments, . . . ) ; balance information (provided by a bank), credit limits (defined by the issuer) and other limits (defined by the customer 80).

The structure and content of the Summary file 210 and the E-Bill file 215 varies from biller to biller. The Summary file includes the highest level representation of the customer's bill. Examples of the type of data included in the Summary file 210 are the customer's name, account number, location (address) of the bill destination, account balance, current amount due, amount past due, and minimum due. The E-Bill file 215 contains data related to the customer's current E-Bills along with historical E-Bill data which is retained for a certain period of time. The E-Bill data residing in this file 215 contains the detailed description of the customer's bill (e.g., details of all of the charges on a credit card for the applicable period in the case of a credit card biller). In a preferred embodiment of the present invention, the E-Bill file 215 is an object oriented file in which the E-Bills are stored as objects. The E-bill file 215 can be both industry specific and/or biller specific. For example, if the IIP 20 has several utility billers, a standard format for a utility bill can be derived (e.g., a graph illustrating the customer's usage). Within the standard format, each utility biller can customize the format of its own bill to be presented to its customers 80. Alternatively, each biller can custom format the entire look and feel of its bill.

Insert file 235 contains the marketing inserts and/or other informational inserts described above. The data contained in the insert files is accessed at the time of the generation of the E-Bills which are to be presented to the customers 80. As described above, the biller can directly specify which customers 80 are to receive which inserts, or IIP 20 can provide a value added marketing service in which it identifies which customers 80 are to receive which inserts.

The Payment file 225 contains the payments currently pending from the customers 80, payments being processed and a historical record of payments made by the customers 80. The Payment database 225 houses all data fields required to create an ACH or credit card payment as well as the fields needed to create payments via smart card, digital currency, and/or other future payment mechanisms. Additionally, the Payment file 225 stores the data required to track the status of a payment (scheduled, in process, . . . ). In a preferred embodiment of the present invention, the Payment file 225 is preloaded with all of the bills for the current period. As the bills are sent out and payments are made, the status of the bills in the Payment file 225 will change. For example, if a customer 80 has preauthorized automatic payment of a bill, the bill amount (and other bill related data) is preloaded in the Payment file 225 and the status of the bill is 'scheduled'. At the time preauthorized by the customer 80, the payment will be initiated and the status changes to 'in process'. Once the payment has cleared, the status of the bill in Payment file 225 changes to 'paid'.

The Inquiry file 230 is used to log and track the resolution of customer service inquiries from both customers 80 and billers 5. As described below, in a preferred embodiment of the present invention, the main use of this file is by the Customer Service Representatives designated by the biller 5, but can also be accessed by the billers 5 and customers 80 directly. In a preferred embodiment, thirteen months of inquiries and responses are maintained in the Inquiry file 230.

Element 240 is the application server for the BAP database system 200. The application server 240 acts as the interface to the database server 202 which contains the database files 205–235. The application server 240 also acts as the interface of the BAP 200 to the external world (i.e., channels 310–320) through firewall 305. Although only a single firewall 305 has been depicted in FIG. 3, it will apparent to one skilled in the art that several firewalls and proxy servers can implement the external interface.

Element 250 is the payment processing system for the BAP system 200. One example of a payment processor is the Customer Electronic Payment System™ (CEPS) developed by the Chase Manhattan Bank. The function of the payment processing system 250 is to take payment instructions from a customer 80 and to execute these instructions in order to debit the payment from the customer's account and to credit the biller account. Two predominate ways in which the payment processing system 250 accomplishes this task is by interfacing with the Automated Clearing House network for debits from customer's Demand Deposit Accounts (DDA) (e.g., checking and savings accounts) and interfacing with Merchant Processors for charges against customer credit and debit cards (e.g., Visa™ or Mastercard™). In processing payments, the payment processing system 250 accesses both the Enrollment file 205 and the Payment File 225 in order to retrieve the customer's payment instructions.

As the billing data from the biller's legacy accounting systems is received by the BAP 200, it first goes through a splitter 255. The purpose of the splitter 255 is to separate the billing data with respect to customers 80 which are to be presented bills electronically by the IIP 20, and those which still desire to receive traditional paper bills. If a paper bill customer 80 has signed up for automatic payment processing, some of the billing data from biller 5 will be stored in the BAP 200. Otherwise, data related to customers 80 receiving paper bills is not retained by the IIP 20. One exception to this general rule is if the biller 5 desires to maintain electronic data for all of its customers 80, in anticipation of the customers 80 eventually signing up for electronic bill presentment. In such a case, the IIP 20 is able to immediately present an electronic bill to the previous paper customer 80.

If the biller 5 has contracted the IIP 20 to generate the paper bills, the billing data is routed to the system (e.g., an outsource not shown in FIG. 3 ) which generates and mails the paper bills. In an alternative embodiment, the biller 5 can have a different entity generate and mail the paper bills, but have the IIP 20 do all of the payment processing. In such a case, the IIP 20 retains, through splitter 255, at least a certain amount of the billing data. Furthermore, if IIP 20 is to maintain a complete customer service database, the IIP 20 may be contracted to retain all of the billing data related to paper customers 80 in order to facilitate use of the Inquiry database file 230.

Element 245 is a reformatting processor which reformats the legacy billing data from the biller 5 in the appropriate format for inclusion on the database server 202. The billing data for the electronic bills is passed from the splitter 255 to the reformatting processor 245 once the splitter 255 has separated out the data for the paper bills. The details of the formatting by reformatting processor 245 varies from biller to biller and is driven by the format of the billing data provided by the biller. The reformatting processor 245 feeds the Summary data file 210 and the E-Bill database 215 with the data as described above with respect to each of these databases 210, 215.

Figure 3:
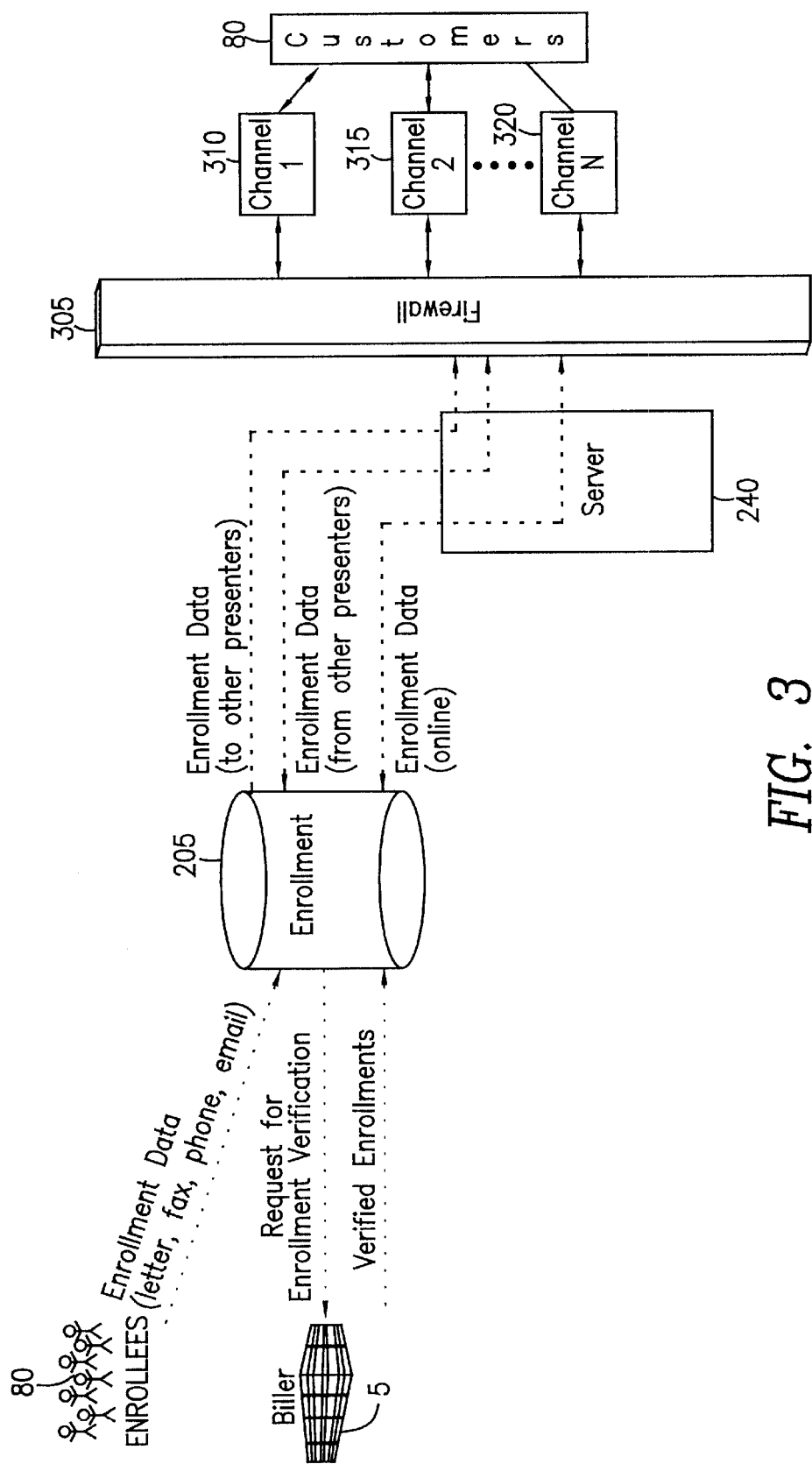
FIG. 3 illustrates the flow of data during the enrollment process.

FIG. 3 additionally illustrates an overview of the processing and data flow in the BAP 200. The enrollment data regarding customers 80 can either be manually entered and updated in Enrollment database 205 and/or electronic files can be received, edited and uploaded into file 205. The enrollment data can either come directly to the BAP 200 (not shown in FIG. 3) from the customers 80 as illustrated in FIG. 3, or it can come from the biller 5, or one of the biller's CSPs (elements 40–45 in FIG. 1). The BAP system 200 is capable of producing an audit trail of all additions, changes and deletions to and from Enrollment database 205. Furthermore, with respect to Enrollment database 205, BAP system 200 is capable of performing the following functions: extracting, reformatting, and transmitting the contents of the Enrollment data file 205 to the billers 5; performing custom analysis of enrollment data and producing reports; generating ACH prenotes and processing negative responses; validating credit cards registered as a payment vehicle; receiving, storing, and retrieving image files of enrollment documentation; receiving and store balances and credit limits; generating customer correspondence (welcome, reminders . . . ) based on the content of the Enrollment database 205 (via paper and email); triggering all types of automatic payments as scheduled in the enrollment preferences (in conjunction with payment processor 250); providing expandability for anticipated growth of enrollment data fields.

As described above, billers 5 deliver legacy billing files to the BAP 200. The splitter 255 identifies billing data associated with paper customers 80 and handles the paper customer's billing data appropriately as described above. Reformatting processor 245 executes mapping routines which reformats the ariously formatted billing data from the billers 5 into the format required for inclusion in the files 205–235 on database server 202. In addition to the transmission of billing data, a biller 5, or a biller's agent, at least once, delivers graphical templates and the indicators which link the different channels of distribution 310–320 to templates. Alternatively, the IIP 20 itself can develop a new template or modify an existing template for the biller 5. The templates are stored in Template file 220 and are used during bill generation to format a bill for a particular customer 80 that has identified a particular channel of distribution. For example, if the bill is to be presented on a biller's direct presentation Internet site 35 (FIG. 1), the Template file 220 will contain a template which will enable the billing data for that bill to be properly formatted for presentation on that site 35. As described above, the billers 5 also transmit to the BAP 200 any marketing inserts 60 (advertising, regulatory, and/or informational Inserts) along with targeting logic which links customers 80 to inserts 60. This insert data is stored in Insert file 235.

With respect to the Summary 210 and E-Bill 215 data files, BAP system 200 is capable of performing the following functions: storing a predetermined amount (e.g., thirteen months) of bill data history for each biller 5; accepting manual entry/update of bill data and producing an audit trail; receiving, editing and uploading legacy billing data files from biller 5; sending and receiving summary data; producing audit trails of all addition, change, and delete activity on files 210 and 215; extracting, reformatting, and transmitting billing data files; performing custom analysis of bill data and producing reports; and providing expandability for anticipated growth of bill and non-bill data (e.g., marketing inserts 60). With respect to the marketing inserts 60 contained in file 235, the BAP 200 can: receive and store a predetermined amount (e.g., thirteen months) of insert history; receive, store and execute the logic required for developing and executing the conditional targeting associated with the marketing inserts 60; track a wide variety of access statistics (e.g., number read by customers 80, number responded to, types of customers 80 who responded . . . ); online processing of responses from customers 80 (e.g., "I want to buy that luggage, please debit my account and send it to . . . "); and certification that an insert was read (for regulatory purposes among others).

Armed with all of the above, the BAP 200 is capable of creating an electronic bill. How the electronic bill is formulated (in an email, as an HTML page . . . ) and where it is delivered (to an email address, to a presentment site . . . ) will be governed by the customers' 80 enrollment data contained in database 205. Application 'plug-ins' residing on application server 240 accomplish the actual formatting of the electronic bills. The plug-ins contain the software required to format the data in E-Bill 215 and Summary 210 files for the channel of distribution to which an electronic bill is to be published. There is a different plug-in for each channel of distribution. For example there is one plug-in for formatting the bill for a Voice Response unit channel of distribution and different plug-in for formatting a bill or an Internet web page. Furthermore, within a category of channels of distribution, there must specific plug-ins for each specific destination. For example, the formatting for one type of E-Mail browser is different than the format required for a different E-Mail browser. As additional channels of distribution are created and different devices for receiving information on those channels are developed, new plug-ins must be added to application server 240 in order to properly format electronic bills for those new channels and new devices.

Once generated, the E-bill is transmitted to the customers 80 through the a firewall 305 and out distribution channels 310–320. The firewall 305 serves to protect the BAP 200 from unauthorized intrusion. As described above, the BAP 200 is capable of publishing bills to multiple presentment vehicles 310–320, either singly, simultaneously or sequentially. For example, one customer 80 might want its bills on a certain web page, while another customer 80 might ask to have its bills sent via E-Mail and posted on a web page simultaneously. The BAP 200 of the present invention easily accomplishes this function by merely formatting the same data from database server 202 for each of the channels requested by the customer 80 and sending them out the requested channels simultaneously. Similarly a customer 80 might request that its E-Bill is first presented on an Internet site and if the bill is not paid within five days that the bill is sent to its E-Mail address. As described above, in addition to the electronic bills, the BAP 200 also presents documents and other non-bill information (such as statements and marketing inserts that may or may not be associated with bill payments).

In presenting E-Bills via Email, the BAP 200 is capable of delivering secure Email notices of bill availability and providing a hotlink to an appropriate web site, or the BAP can deliver secure bills directly via Email. The Email capability of the BAP 200 includes conforming to all standard Email Protocols (STMP, MIME, SMIME . . . ). Without requiring software on the customer's Desktop, the BAP can certify that the Email was read, return secure payment instructions from the customer 80 via Email. The BAP 200 can also track unopened bills and generation reminders as specified in the reminder preferences contained in the Enrollment database file 205.

If the E-bill is to be presented to a CSP or Biller direct site web page, the IIP 20 can send summary data to the CSP and dynamically render the required HTML pages. For Internet operations, the Server 240 and the firewall 305 allows customers 80 to view their E-Bills from any presentment site 310–320. As described above, the BAP 200 is capable of presenting bills to customers 80 via virtually any channel 310–320 which can carry the bills such as Personal Financial Managers (PFM's, e.g., Quicken™ or MSMoney™), video phones, interactive TV (cable or satellite), ATM's, pagers, VRUs, paper, facsimile, or any other new presentment vehicle which is developed in the future.

With respect to payments, the BAP 200 initiates the automatic payments prescribed in the enrollment profiles 205 without any initiative required by the customers 80. As described above, the payment processor 250 accomplishes payment processing by executing customer payment instructions through external payment systems 325 such as ACH 330, Merchant Processors 335 or other payment systems 340 (smart cards, digital cash . . . ). For both management and customer service purposes, the BAP 200 keeps track of the status of customer payments, i.e., scheduled, in process, disputed, paid, and posted. As described above, some of the presentment vehicles, Transpoint™ for example, do not currently process payments. Instead they produce a file of payment instructions which is processed by the payment processor 250. These payments are also tracked as described above. The BAP 200 has the ability to extract, analyze, reformat, and transmit payment data. In addition to the above functions, the BAP 200 can: extract, reformat, and deliver payment data to destinations other than the payment processor 250 (e.g., back to the biller 5); receive, reformat, edit and upload payment data from other presentment vehicles (e.g., Transpoint™, biller direct sites, email . . . ); receive, reformat, edit and upload posting data from billers 5; and analyze and proactively identify defined payment conditions such as "almost late".

The BAP 200 provides online access for customer service representatives (either from the IIP 20, a biller 5, or a biller's other agent) in order to: view customer service inquiries; view a customer's bill; view and update enrollment data, view payment data; and create responses. The BAP 200 provides customer service representatives or other operators with the capability to: prioritize, assign and reassign open inquiries; proactively track response and the aging of responses; track the workflow tracking of the entire EBPP process (bill creation, reminders, insert responses, payments . . . ); create and store Information Services Management MIS data to support customer service inquiries; extract, reformat, and transmit customer service data to billers 5; spot check bills prior to publication; and provide full audit control over all add/change/delete activity.

As described above, a predetermined amount (e.g., thirteen months) of customer service inquires and responses are maintained by the BAP 200. This information is used to provide different levels of support. For billers 5 that wish to provide their own customer service, the BAP 200 extracts, reformats and transmits the relevant data to the biller 5 (alternatively, this information could be posted to a dedicated web site). For billers 5 that wish to outsource the customer service function, the BAP 200 provides online access to view, track, assign, and reassign the inquiries.

Other capabilities provided by the BAP 200 system include: an OLAP tool for analyzing data; a data mining tool (for identifying patterns); a data mapping tool; security of data stored in databases 205–235; security of all data transmissions; security of all customer interfaces; the opportunity to use certificate authority; certified year 2000 compliant; an industry-wide biller/customer LDAP database; scalability for volume increase; disaster recovery; viability outside U.S. borders (128 bit encryption exportability, multilingual, multicurrency . . . ); and the ability to handle business to business EBPP.

Figure 4:
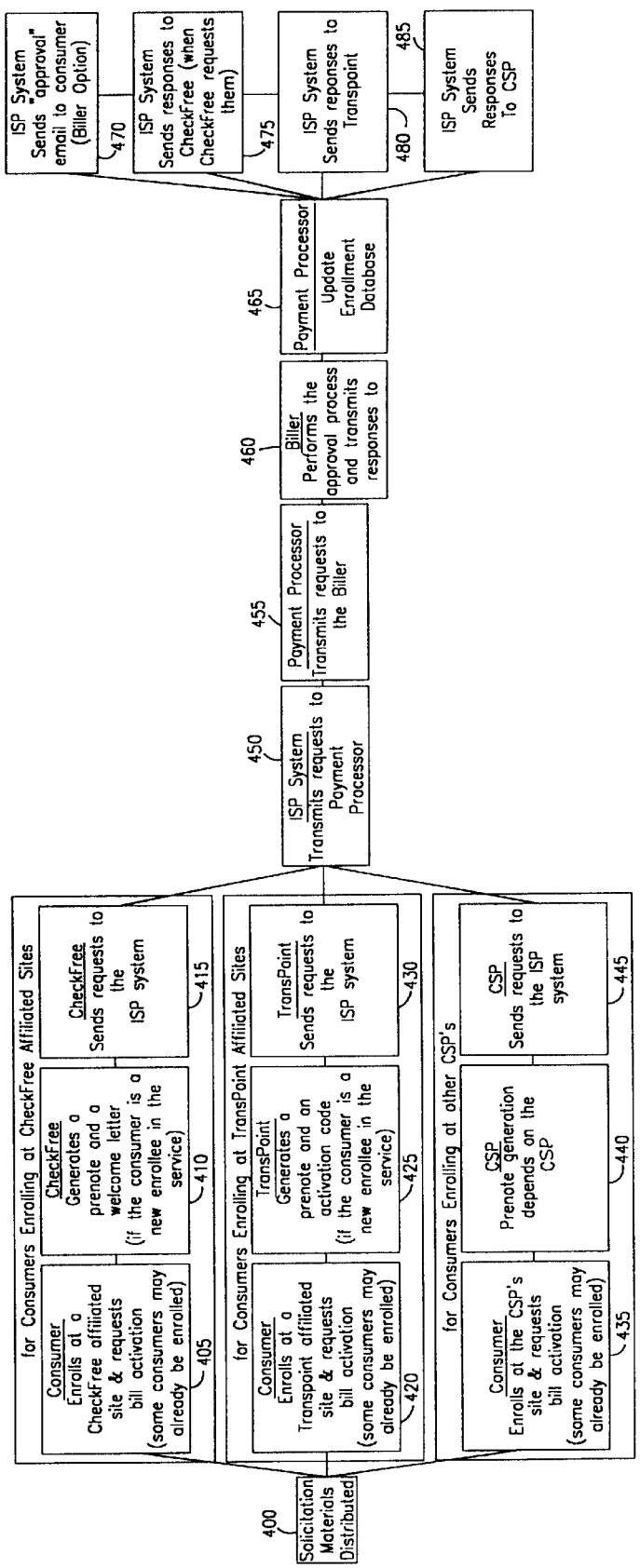
FIG. 4 is a flow chart illustrating the process of enrollment.

The process of enrollment will be discussed with respect to FIGS. 3 and 4. FIG. 3 illustrates the flow of data during the enrollment process through the BAP 200 while FIG. 4 is a flow chart illustrating the process of enrollment. As illustrated in FIG. 4, the first step 400 in the enrollment process is the distribution of the solicitation materials. These materials can be distributed via any of the channels of distribution 310–320 (FIG. 3) previously described. For example the enrollment solicitation can be distributed via paper with the customer's existing traditional paper bill or can be posted on a CSP's presentment site. Steps 405–445 reflect the processing by three different Internet CSPs in responding to an enrollment request by a customer 80. Steps 405–415 relate to a CheckFree™ affiliated site, steps 420–430 relate to a TransPoint™ affiliated site, while steps 435–445 relate to other CSP Internet sites.

With respect to CheckFree™ affiliated sites, in step 405 the customer 80 enrolls at the site and requests bill activation with respect to one or more billers 5. If the customer 80 is already enrolled with the CheckFree™ affiliated site, the customer 80 merely requests bill activation with respect the billers 5 from which it desires E-Bills. What is meant by bill activation is that the customer 80 desires to be presented with electronic bills at the Checkfree™ affiliated site. Naturally, the customer 80 can only request bill activation with respect to billers 5 affiliated with that site. If the customer 80 is enrolling at the Checkfree™ affiliated site for the first time, in response to the enrollment request from the customer 80, CheckFree™, in step 410, generates a welcome letter and a prenote which verifies the existence of a customer's Demand Deposit Account DDA. In step 415, CheckFree™ sends the bill activation request to the IIP 20.

The process of enrollment and bill activation at a TransPoint™ affiliated site is similar to that at a CheckFree™ affiliated site. In step 420 the customer 80 enrolls and/or requests bill activation with respect to one or more billers 5. If the customer 80 is already enrolled with the Transpoint™ affiliated site, the customer 80 merely requests bill activation with respect the billers 5 from which it desires E-Bills. In response to the enrollment request, TransPoint™, in step 425 generates a prenote and an activation code. The activation code is used as a security measure and is sent to the customer's mailing address (provided by the biller 5) in order to ensure that the entity enrolling is really the biller's customer 80. In step 415, TransPoint™ sends the bill activation request to the IIP 20. Steps 435–445 reflect the process of enrolling and activating the E-Bill presentation at a generic Internet CSP and is similar to the process described above with respect the Checkfree™ and Transpoint™ affiliated sites. The precise details of the enrollment process will differ from site to site. The result of the bill activation at any of the CSP sites is a request for activation which is sent to the IIP 20. The activation request must contain at least some subset of the data from the customer 80 outlined above with respect to the Enrollment database 205 (e.g., name, address, method of preferred payment . . . ).

In the embodiment of the present invention illustrated in step 450, bill activation requests are handled in the BAP 200 by the payment processor 250. Alternatively, a different processor in the BAP 200 can process bill activation requests. In step 455, the payment processor 250 consolidates and transmits the bill activation requests to the various billers 5 which are the targets of the requests. As depicted in FIG. 3, the BAP 200 is also capable of directly receiving bill activation requests directly from customers 80 through letter, phone fax . . . These directly received activation requests are consolidated with the CSP generated activation requests for transmission to the billers 5. In step 460 FIG. 4 each biller 5 performs its own internal approval process with respect to the customers' 80 requests for bill activation and transmits its responses to the payment processor 250 in the BAP 200 which updates the Enrollment database 465 with the biller 5 responses. In step 470, at the option of the biller 5, the IIP 20 sends the result of the approval process to the customer 80 via Email. In steps 475–485, the IIP 20 similarly sends the result of the biller's approval process to the CSP which received the bill activation request from the customer 80.

Figure 5:
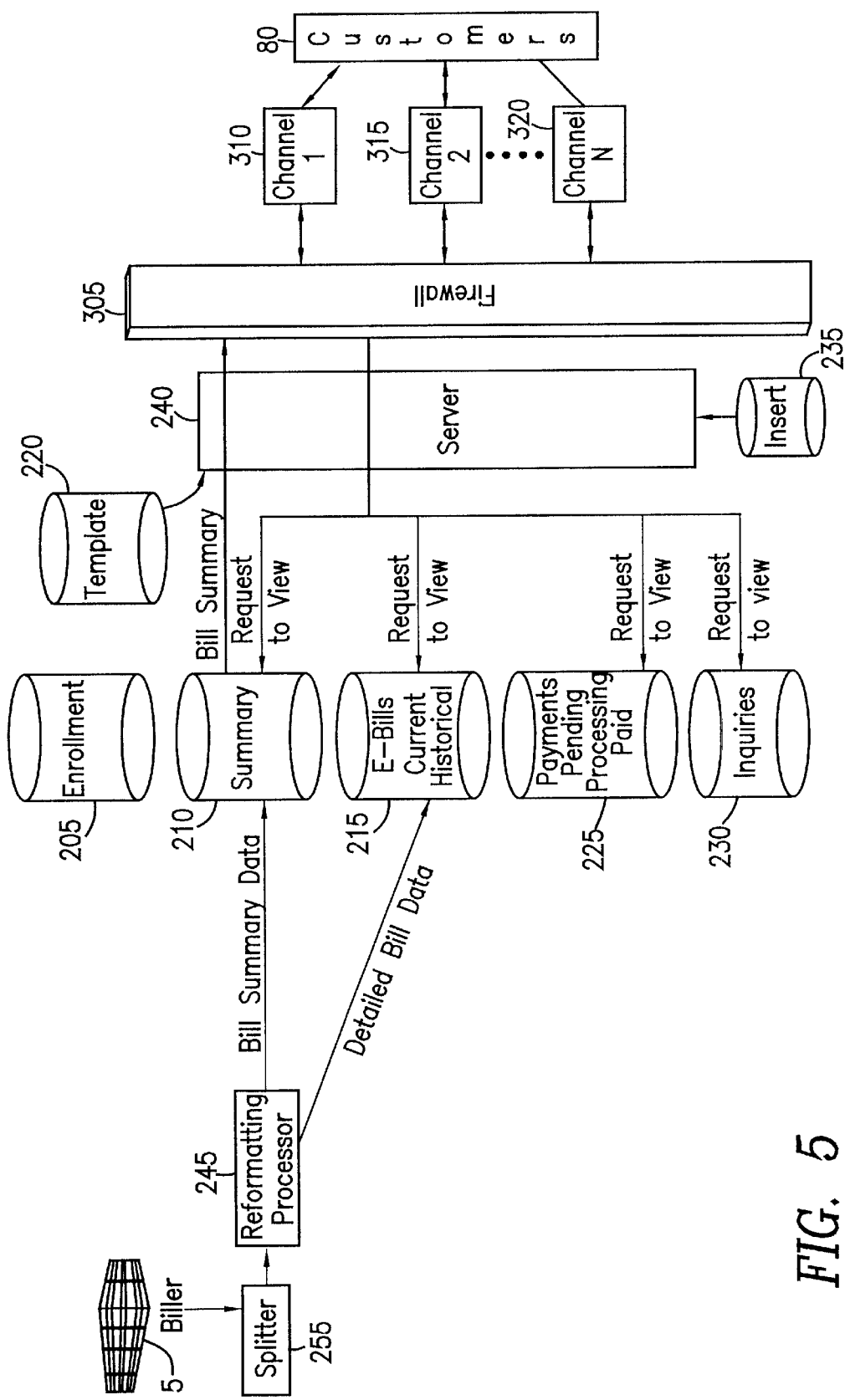
FIG. 5 illustrates the flow of data during the bill presentment process.
Figure 6:
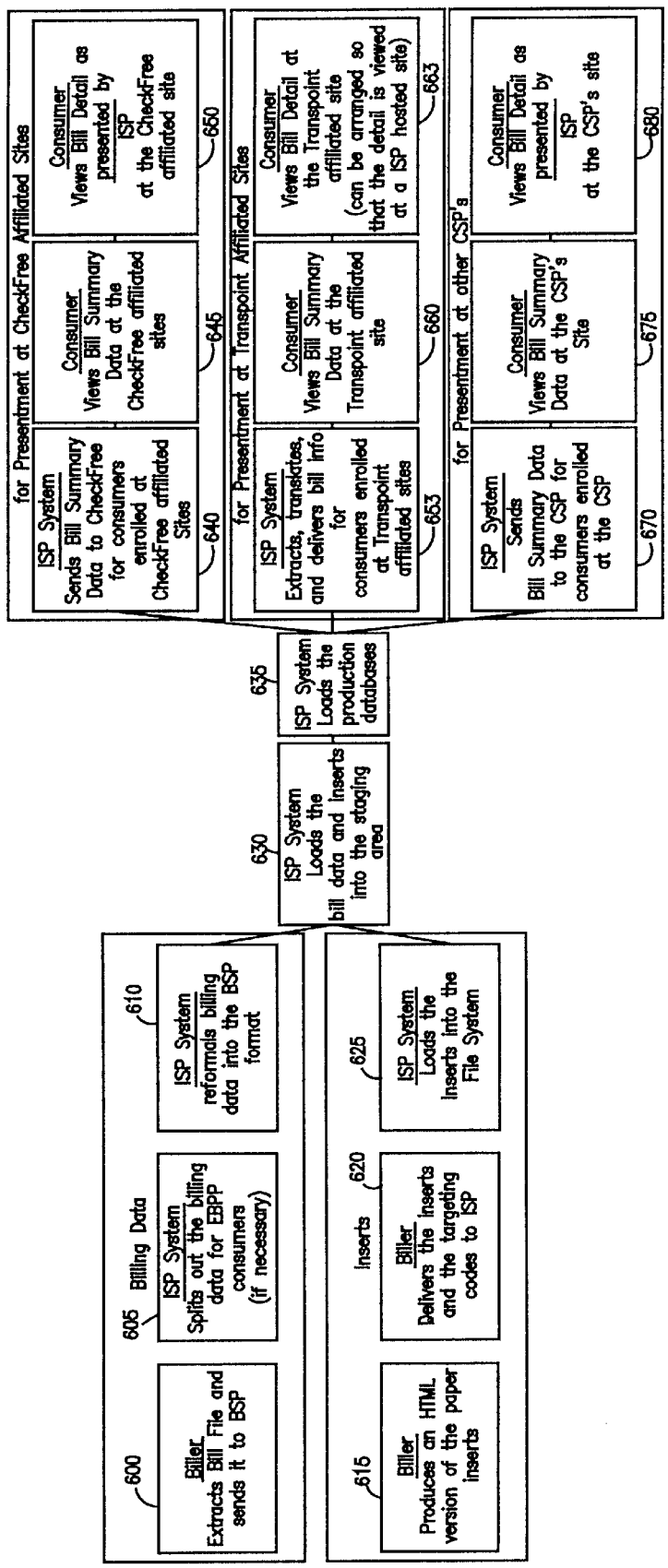
FIG. 6 is a flow chart illustrating the process of bill presentment.

The process of bill presentment will be discussed with respect to FIGS. 5 and 6. FIG. 5 illustrates the flow of data from a biller 5 through the IIP 20 and to customers 80 during the bill presentment process, and FIG. 6 is a flow chart illustrating the process of bill presentment. Steps 600–610 in FIG. 6 illustrate the steps taken with respect to billing data from a biller 5, while steps 615–625 depict the analogous steps with respect to marketing inserts. In step 600, the biller 5 extracts the relevant billing data from its legacy A/R system and transmits this data to the IIP 20. No special formatting of the billing data is required by the biller 5 as reformatting of the data is accomplished by the IIP 20 as described below. In step 605, upon receipt of the billing data from the biller 5, the IIP 20 splits out the data which is going to be sent to customers 80 via paper or electronically as described above. In step 610, the reformatting processor 245 (FIG. 5) reformats the billing data into the format required for insertion into the Summary and E-Bill Files 210, 215.

With respect to inserts, in step 615 the biller 5 produces a hypertext markup language (HTML) version of the paper insert. In step 620 the biller 5 transmits the HTML inserts and the targeting codes to the IIP 20 for inclusion in Insert database 235. The targeting codes enable the IIP 20 to be able to identify which customers 80 are to receive which inserts. In step 625, the IIP 20, upon receipt of the insert files from the biller 5, loads the inserts into the Insert file 235.

After both the billing data and inserts have been received and properly formatted, the IIP 20, in step 630, loads the billing and insert data into a staging area from which this data is loaded into the databases 210–215 and 235. All of the data is now available and the bills and/or inserts can be presented to the customers 80. Steps 640–650 illustrate presentation of E-Bills to customers 80 at Checkfree™ affiliated sites, steps 655-665 illustrate presentation at Transpoint™ affiliated sites, and steps 670–680 depict the flow of presentation at generic CSP Internet sites. In step 640 bill summary data is sent to and received by the Checkfree™ affiliated site. In step 645, the bill summary is presented to the customer 80 when he/she logs onto the site. In step 650, if desired, the customer 80 is able to view the detailed E-bill on the BAP 200 as is illustrated in FIG. 5. This is an optional step since the customer 80 can pay the bill without having to look at the detailed bill. Similar to the steps related to the Checkfree™ affiliated sites, the summary data is received by Transpoint™ or generic CSP sites (steps 655, 670), the customer 80 is presented with summary data (steps 660, 675), and the customer 80 is able to view the full, detailed E-Bill (steps 665–680).

Figure 7:
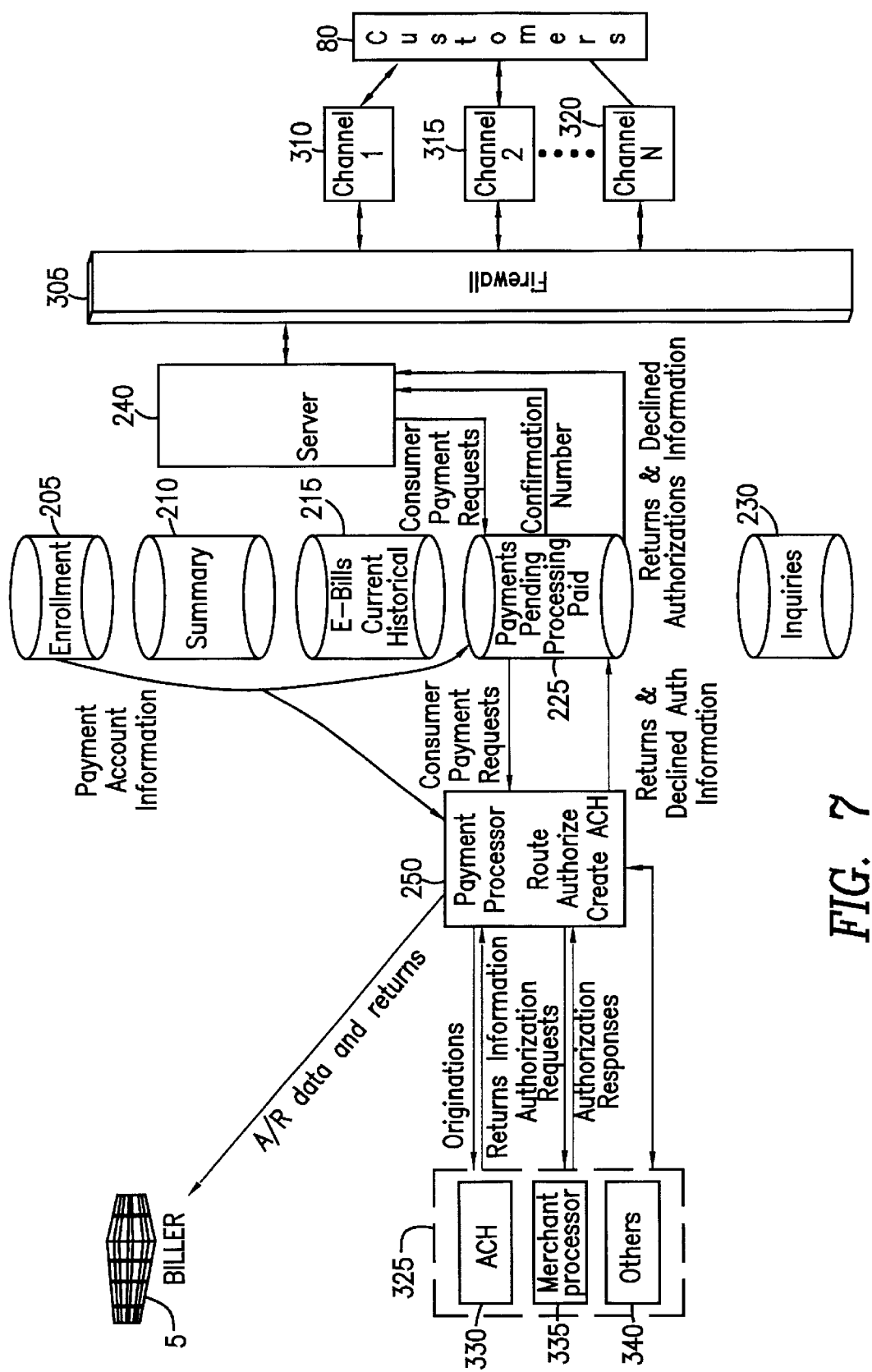
FIG. 7 illustrates the flow of data during the payment process.
Figure 8:
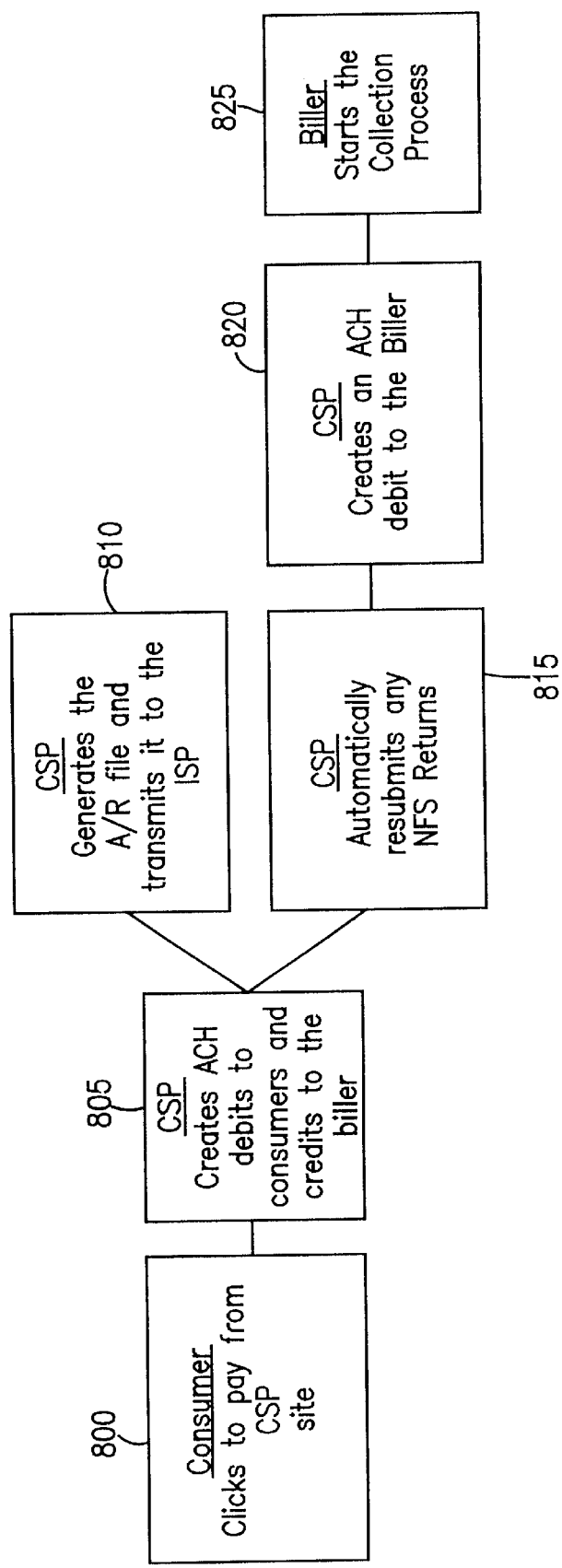
FIG. 8 is a flow chart illustrating the processing of payments through a CSP presentation site which has payment processing capabilities.
Figure 9:
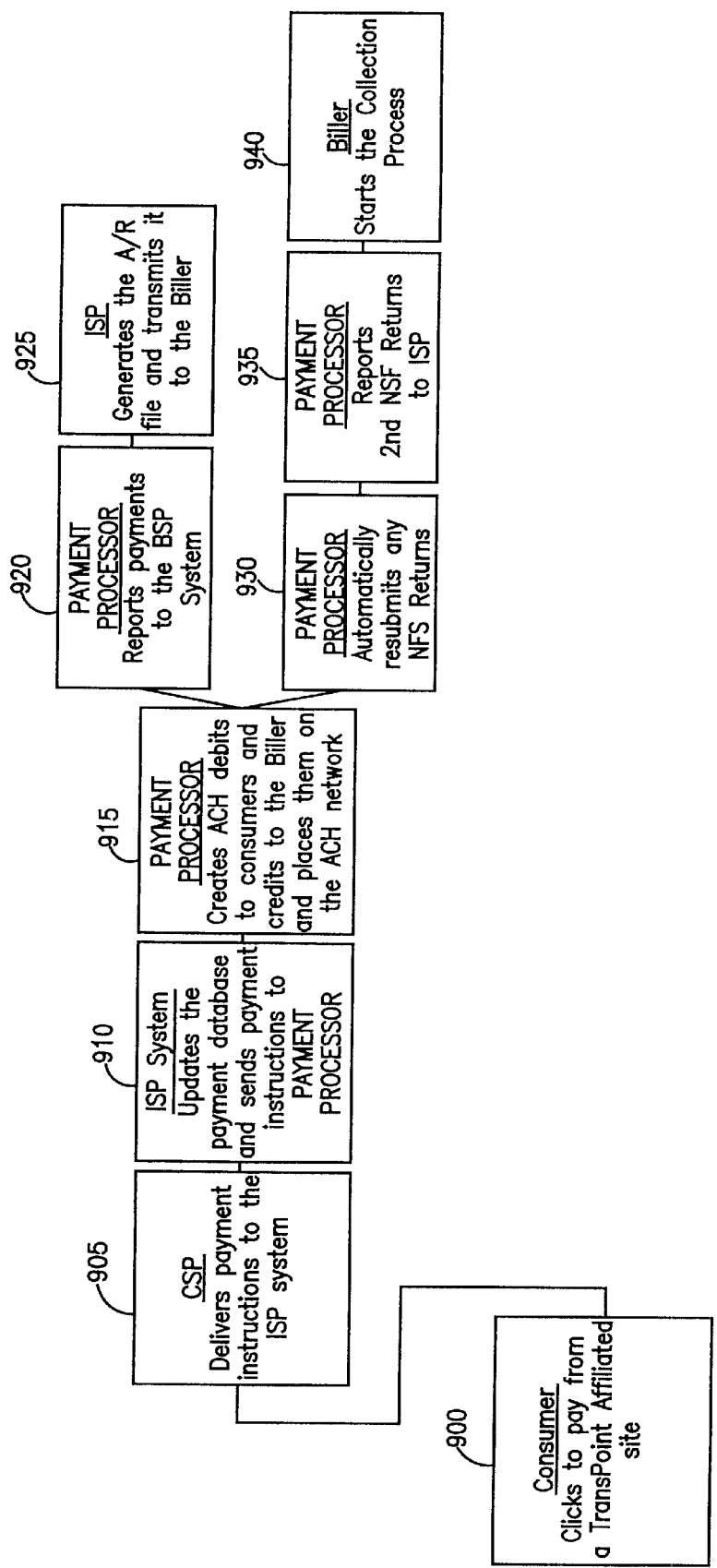
FIG. 9 is a flow chart illustrating the processing of payments through a CSP presentation site which does not have payment processing capabilities.

After having the opportunity to review its bill, a customer 80 can initiate the payment process as is described in relation to FIGS. 7–9. FIG. 7 illustrates the flow of data in the BAP 200 during the payment process, FIG. 8 is a flow chart illustrating the processing of payments through a CSP presentation site which has payment processing capabilities, while FIG. 9 depicts the processing of payments through a CSP presentation site which does not have payment processing capabilities. Although the embodiments depicted in FIGS. 8 and 9 have been illustrated with respect to a customer 80 paying though a DDA account, similar processes are followed with respect to the other payment mechanisms described above (e.g., credit cards, debit cards . . . ). In step 800, as illustrated in FIG. 8, a customer 80 clicks to pay its bill at a CSP presentation site which has payment processing capabilities (e.g., a Checkfree™ affiliated site). The payment model depicted in FIG. 8 n steps 805–825 is known as a reversibility model since the credit to the biller 5 by the CSP can be reversed as a debit if the payment from the customer 80 fails to clear. Other payment models known to those skilled in the art are a Risk-Based model, and a Guaranteed Funds model. The present invention can operate under either these three models (or any other suitable model) upon agreement with the biller 5. In step 805 of the Reversibility model, in response to the payment instruction by the customer 80, the CSP generates an ACH debit to the customer 80 to debit the account identified by the customer 80, and also credits the biller 5 in the amount debited from the customer 80. If the ACH instruction clears, the CSP generates an A/R file which is transmitted to the IIP 20 in step 810. The A/R file from the CSP is kept and consolidated with other A/R files for ultimate transmission to the biller 5. If the ACH does not clear (insufficient funds), the CSP, in step 815, automatically resubmits the ACH. If the ACH still does not clear the second time, the CSP, in step 820, debits the account of the biller 5, at which point it is the responsibility of the biller 5 to start a collection process against the customer 80 (step 825). As an alternative to the CSP forwarding the A/R to the IIP 20 in step 810, the CSP can forward the A/R file directly to the biller 5. In such an embodiment, though, some of the advantages of the present invention are lost in that the biller 5 will be receiving multiple A/R file from multiple locations (CSPs) instead of a single consolidated A/R file from the IIP 20.

FIG. 9 illustrates the payment processing with respect to CSPs which do not have payment processing capabilities (e.g., most biller direct sites and a Transpoint™ affiliated sites). As illustrated in FIG. 9, when a customer 80 clicks to pay a bill from such a CSP presentation site (step 900), the CSP transmits a payment instruction to the IIP 20 (step 905). In step 910, the IIP 20 updates the payment database 225 and send the payment instruction to the payment processor 250. In step 915, the payment processor generates the ACH debits and credits from and to the customer 80 and biller 5 respectfully and transmits these instructions to the ACH network 330. In this embodiment, the customer 80 is paying its bill from a DDA account, thus the instruction to the ACH network. If the customer 80 was paying by another means, e.g., a credit card, the payment processor would process the payment accordingly, e.g., through the merchant processing system 335 (FIG. 2). If the ACH instruction clears, the payment processor 250 updates the payment database 225 to reflect the payment (step 920). In step 925, the IIP 20 generates a consolidated A/R (reflecting the customer's payment along with all other payments for the applicable time period) which is transmitted to the biller 5. If the ACH does not clear (insufficient funds), the payment processor 250 automatically resubmits the ACH in step 930. If the ACH still does not clear a second time (step 935) the biller 5 starts its collection process against the customer 80 (step 940).

Figure 10:
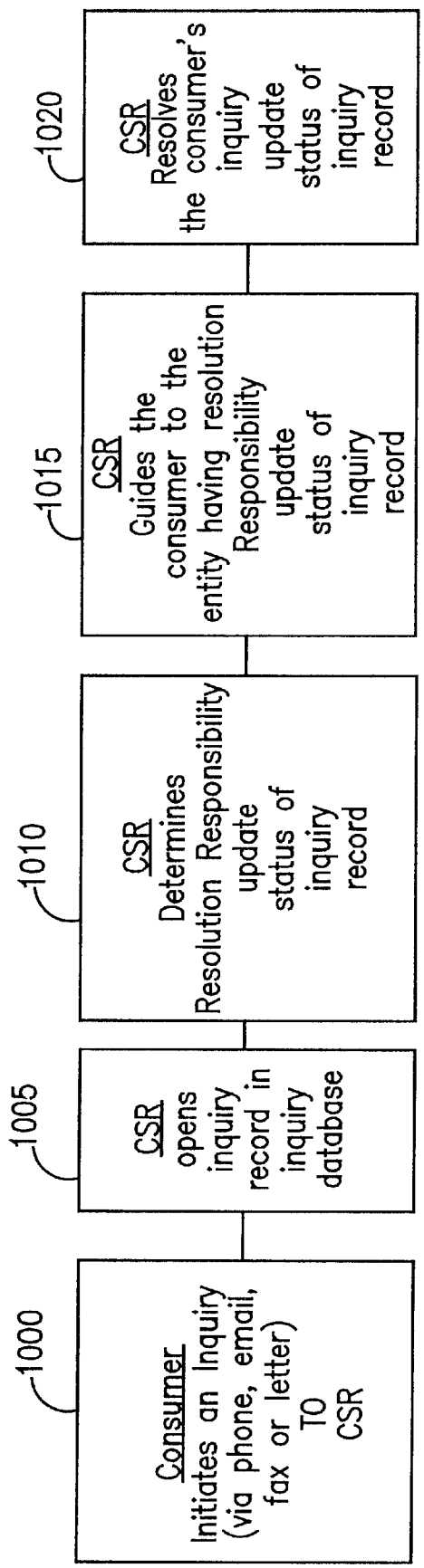
FIG. 10 is a flow chart illustrating the process of tracking and resolving customer service inquiries.

FIG. 10 is a flow chart illustrating the process of resolving customer service inquiries. In step 1000 a customer 80 inquiry is received by the Customer Service Representative (CSR). The CSR can either be the biller 5, an entity outsourced by the biller 5, the IIP 20 or the CSP where the customer 80 is receiving its bills. In step 1005, the CSR creates a new record in the Inquiry database 230 (FIG. 2). This record will be used to track the customer's inquiry until its final resolution. In the preferred embodiment, the biller 5 will always be able to view and query the Inquiry database 230 in order to track customer's billing problems. In an alternative embodiment, the customers 80 themselves are able to view the Inquiry database with respect to the inquiries which have been initiated by them. In step 1010, the CSR determines the party with responsibility for resolving the customers' problem and directs the problem to that party. For example, if the bill was properly generated by the IIP 20 and properly presented by the CSP, the problem is most likely with data supplied by the biller 5. In such an example, the CSR informs the biller 5 of the problem, which then has responsibility for final resolution of the customer's problem. Once the CSR has identified the responsible party and directed the problem to that party, the CSR updates the Inquiry database 230 to reflect this determination. In steps 1015 and 1020, the CSR monitors the resolution of the customer's problem and updates the Inquiry database accordingly.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

What is claimed is:

1. A system for presenting information from at least one provider to a plurality of customers over a plurality of electronic channels of distribution, the system comprising:

a formatting processor for receiving the information from the provider and formatting the information for storage, wherein the information received from the at least one provider is bulk information that includes a first portion of information related to customers that do not desire to receive the information electronically;

a splitting processor coupled to the formatting processor, the splitting processor identifying the first portion of the bulk information from the at least one provider related to customers that do not desire to receive the information:

a database server for (i) receiving and storing the second portion of information from the bulk formatting processor, and (ii) storing customer data including customer preference data identifying at least two preferred electronic channels of distribution over which respective customers desire to receive the information; and an application server coupled to the database server and the plurality of electronic channels of distribution, the application server (i) receiving the second portion of the bulk information from the database server, (ii) formatting the second portion of the bulk information for distribution over at least one of the electronic channels in response to at least some of the customer data, and (iii) distributing the second portion of the bulk information to at least one of the plurality of customers over one of the at least two preferred electronic channels of distribution with respect to the at least one customer.

2. The system of claim 1, wherein the database server includes a template database for storing at least one template used by the application server in formatting the information for distribution over one or more of the plurality of electronic channels.

3. The system of claim 1, wherein the database server includes an information database for storing the second portion of the bulk information formatted for storage by the formatting processor.

4. The system of claim 1, wherein the splitting processor is operable to retain the first portion of the bulk information and pass the second portion of the bulk information to the formatting processor.

5. The system of claim 1, wherein the information database includes at least summary information and detailed information.

6. The system of claim 5, wherein the application server is operable to format the summary information and distribute the summary information to the customers.

7. The system of claim 7, wherein the application server is operable to format the detailed information such that the at least one customer may view the detailed information.

8. The system of claim 1, wherein the database server further comprises a marketing insert database for storing marketing information, the application server (i) formatting the marketing information for distribution over at least one of the electronic channels in response to at least some of the customer data, and (ii) distributing the formatted marketing information to the at least one customer along with the information.

9. The system of claim 1, wherein the database server further comprises a response database for storing response information received by the application server from the at least one customer in response to the distributed information.

10. The system of claim 1, wherein the database server further comprises a customer service database for storing customer service information used for tracking customer problems identified by customers, the customer service database being accessible by the at least one provider.

11. A method for presenting information from at least one provider to a plurality of customers over a plurality of electronic channels of distribution, the method comprising the steps of:

receiving the information from the at least one provider, wherein the information received from the at least one provider is bulk information that includes a first portion of information related to customers that do not desire to receive the information electronically;

slitting processor identifying the first portion of the bulk information related to customers that do not desire to receive the information electronically formatting second portion of the information for storage;

storing the formatted second portion of the bulk information;

storing customer data identifying at least two preferred ones of the plurality of electronic channels of distribution over which respective customers desire to receive second portion bulk the information;

formatting the second portion of the information for distribution over at least one of the electronic channels in response to at least some of the customer data; and distributing the second portion of the bulk information to at least one of the plurality of customers over one of the at least two preferred electronic channels of distribution with respect to the at least one customer.

12. The method of claim 11, for further comprising the step of storing at least one template for formatting the second portion of the bulk information for distribution over one or more of the plurality of electronic channels.

13. The method of claim 11, further comprising the step of discarding the identified portions of the bulk information.

14. The method of claim 11, wherein the step of formatting the second portion of the bulk information for storage further comprises the step of generating at least summary information and detailed information.

15. The method of claim 14, wherein the steps of formatting the second portion of the bulk information for distribution and distributing the information comprise the steps of formatting the summary information for distribution over at least one of the electronic channels and distributing the summary information to at least one of the customers.

16. The method of claim 14, further comprising the step of formatting the detailed information for distribution over at least one of the electronic channels such that the detailed information may be viewed by the customers.

17. The method of claim 11, further comprising the steps of:
  storing marketing information;
  formatting the marketing information for distribution over at least one of the electronic channels in response to at least some of the customer data; and
  distributing the marketing information to the customers along with the information.

18. The method of claim 11, further comprising the steps of:
  receiving response information from the at least one customer in response to the distributed information; and
  storing the response information.

19. The method of claim 18, further comprising the step of transmitting the response information to the at least one provider.

20. The method of claim 11, further comprising the steps of:
  storing customer service information used for tracking customer problems identified by customers; and
  permitting the at least one provider access to the customer service information.

21. A system for presenting billing information from at least one biller to a plurality of customers over a plurality of electronic channels of distribution, the system comprising:
  a formatting processor for receiving the billing information from the at least one biller and formatting the billing information for storage, wherein the billing information received from the at least one biller is bulk billing information that includes first billing information related to customers that do not desire to receive the billing information electronically;
  a splitting processor coupled to the formatting processor, the splitting processor identifying the first billing information related to customers that do not desire to receive the billing information electronically;
  a database server for (i) receiving and storing second billing information from the formatting processor, and (ii) storing customer data including customer preference data identifying at least two preferred electronic channels of distribution over which respective customers desire to receive the second billing information; and
  an application server coupled to the database server and the plurality of electronic channels of distribution, the application server for (i) receiving the second billing information from the database server, (ii) formatting the second billing information for distribution over at least one of the electronic channels in response to at least some of the customer data, and (iii) distributing the second billing information to at least one of the plurality of customers over at least one of the two preferred electronic channels of distribution with respect to the at least one customer.

22. The system of claim 21, wherein the database server includes a template database for storing at least one template used by the application server for formatting the second billing information for distribution over one or more of the plurality of electronic channels.

23. The system of claim 21, wherein the database server includes an electronic bill database for storing the second billing information formatted for storage by the formatting processor.

24. The system of claim 21, wherein the splitting processor is operable to retain the first billing information and pass the second billing information to the formatting processor.

25. The system of claim 21, wherein the information database includes at least summary billing information and detailed billing information.

26. The system of claim 25, wherein the application server is operable to format the summary billing information and distribute the summary billing information to the customers.

27. The system of claim 25, wherein the application server is operable to format the detailed billing information such that the customers may view the detailed billing information.

28. The system of claim 21, wherein the database server further comprises a marketing insert database for storing marketing information, the application server (i) formatting the marketing information for distribution over at least one of the electronic channels in response to at least some of the customer data, and (ii) distributing the formatted marketing information to the at least one customer along with the billing information.

29. The system of claim 28, wherein the database server further comprises a response database for storing response information received by the application server from the at least one customer in response to the distributed billing information.

30. The system of claim 21, wherein the database server further comprises a customer service database for storing customer service information used for tracking customer problems identified by customers, the customer service database being accessible by the at least one biller.

31. The system of claim 21, further comprising a payment processor for receiving payment instructions from the at least one customer in response to the distributed billing information, the payment processor executing the received payment instructions.

32. The system of claim 31, wherein the database server further comprises a response database for storing the received payment information and storing payment status information reflecting the status of the execution of the received payment instructions by the payment processor.

33. The system of claim 31, wherein the payment processor is coupled to an external Automated Clearing House (ACH) network, wherein certain of the received payment instructions are requests to debit customer's Demand Deposit Accounts (DDA), and wherein the payment processor is operable to execute the certain received payment instructions by transmitting debit instructions to the ACH network.

34. The system of claim 33, wherein the payment processor is operable to transmit credit instructions to the ACH network with respect to an account of the at least one biller in response to the transmitted debit instructions.

35. The system of claim 31, wherein the payment processor is coupled to an external Merchant Processing network, wherein a plurality of the received payment instructions are requests to debit customers' credit or debit card accounts, and wherein the payment processor is operable to execute the plurality of received payment instructions by transmitting debit instructions to the Merchant Processing network.

36. The system of claim 35, wherein the payment processor is operable to transmit credit instructions with respect to an account of the at least one biller in response to the transmitted debit instructions.

37. The system of claim 31, wherein the enrollment database is operable to store automatic payment instructions specified by the customers and the payment processor is operable to execute the automatic payment instructions.

38. The system of claim 37, wherein the automatic payment instructions specify a time at which the automatic payment instruction is to be executed and wherein the payment processor is operable to execute the automatic payment instructions at the specified time.

39. The system of claim 31, wherein the database server includes an enrollment database for storing the customer data, wherein the enrollment database stores customer payment account information identifying at least one account of each customer against which payments by the customers are to be debited.

40. The system of claim 39, wherein the payment processor is operable to execute the received payment instructions in response to the customer payment account information stored in the enrollment database.

41. The system of claim 31, wherein the payment processor is operable to generate a consolidated account receivable file reflecting all payments executed by the payment processor during a predetermined period of time.

42. The system of claim 41, wherein the payment processor is operable to transmit the consolidated account receivable file to the at least one biller.

43. The system of claim 21, wherein the plurality of electronic channels of distribution are selected from the group consisting of Internet web site, Email, personal digital assistant, voice response unit, video phone, programmable cellular phone, interactive cable TV, interactive satellite TV, smartphone, telephone, facsimile, Automated Teller Machine (ATM), and pagers.

44. The system of claim 21, wherein the system is operable to present billing information with respect to a plurality of billers, the system further comprising a plurality of database servers, each database server corresponding to one of each of the billers, each of the plurality of database servers comprising databases related to the customers of the biller corresponding to the database server.

45. A method for presenting billing information from at least one biller to a plurality of customers over a plurality of electronic channels of distribution, the method comprising:

receiving the billing information from the at least one biller, wherein the billing information received from the biller is bulk billing information that includes first billing information related to customers that do not desire to receive the billing information electronically;

a splitting processor identifying the first billing information related to customers that do not desire to receive the information electronically;

formatting second billing information for storage;

storing the formatted second billing information;

storing customer data identifying at least two preferred ones of the plurality of electronic channels of distribution over which respective customers desire to receive the second billing information;

formatting the second billing information for distribution over at least one of the electronic channels in response to at least some of the customer data; and distributing the portion billing information to at least one of the plurality of customers over one of the at least two preferred electronic channels of distribution with respect to the at least one customer.

46. The method of claim 45, further comprising the step of storing at least one template for formatting the second billing information for distribution over one or more of the plurality of electronic channels.

47. The method of claim 45, further comprising the steps of:

retaining the first identified billing information; and passing on the second billing information for formatting and storage.

48. The method of claim 45, wherein the step of formatting the second information for storage comprises the steps of generating at least summary billing information and generating detailed billing information.

49. The method of claim 48, further comprising the steps of formatting the summary billing information for distribution and distributing the summary billing information to at least one of the customers.

50. The method of claim 48, the steps of formatting the detailed billing information for distribution over at least one of the electronic channels and permitting at least one of the customers to view the detailed billing information.

51. The method of claim 45, further comprising the steps of:

storing marketing information;

formatting the marketing information for distribution over at least one of the electronic channels in response to at least some of the customer data; and distributing the marketing information to the at least one customer along with the billing information.

52. The method of claim 45, further comprising the steps of:

receiving response information from the at least one customer in response to the distributed billing information; and storing the response information.

53. The method of claim 45, further comprising the steps of:

storing customer service information used for tracking customer problems identified by customers; and providing access to the stored customer service to the at least one biller.

54. The method of claim 45, further comprising the steps of:

receiving payment instructions from at least one customer in response to the distributed billing information; and executing the received payment instructions.

55. The method of claim 54, further comprising the steps of:

storing the received payment information; and storing payment status information reflecting the status of the execution of the received payment instructions.

56. The method of claim 54, wherein certain of the received payment instructions are requests to debit customer's Demand Deposit Accounts (DDA), the step of executing the received payment instructions comprising transmitting debit instructions with respect to the certain received payment instructions to an external Automated Clearing House (ACH) network.

57. The method of claim 56, further comprising the step of transmitting credit instructions to the ACH network with respect to an account of the at least one biller in response to the transmitted debit instructions.

58. The method of claim 54, wherein a plurality of the received payment instructions are requests to debit customer's credit or debit card accounts, the step of executing the received payment instructions comprising transmitting debit instructions with respect to the plurality of received payment instructions to an external Merchant Processing network.

59. The method of claim 58, further comprising the step of transmitting credit instructions with respect to an account of the at least one biller in response to the transmitted debit instructions.

60. The method of claim 45, further comprising the steps of:

storing automatic payment instructions specified by at least one of the customers; and executing the automatic payment instructions.

61. The method of claim 60, wherein the automatic payment instructions specify a time at which the automatic payment instruction is to be executed, the method further comprising the step of executing the automatic payment instructions at the specified time.

62. The method of claim 45, further comprising the step of storing customer payment account information identifying at least one account of each customer against which payments by the customers are to be debited.

63. The method of claim 62, wherein the step of executing the received payment instructions is in response to the stored customer payment account information.

64. The method of claim 45, further comprising the step of generating a consolidated account receivable file reflecting all payments executed during a predetermined period of time.

65. The method of claim 64, further comprising the step of transmitting the consolidated account receivable file to the at least one biller.

66. The method of claim 45, wherein billing information is presented to customers of a plurality of billers, the method further comprising the step of maintaining a plurality of databases, each database corresponding to one of each of the billers and containing data related to the customers of the biller corresponding to the database.

* * * * *